(12) United States Patent
MacInnis et al.

(10) Patent No.: US 9,042,445 B2
(45) Date of Patent: May 26, 2015

(54) METHOD FOR DEBLOCKING FIELD-FRAME VIDEO

(75) Inventors: Alexander G. MacInnis, Los Altos, CA (US); Sheng Zhong, Fremont, CA (US)

(73) Assignee: BROADCOM CORPORATION, Irvine, CA (US)

( * ) Notice: Subject to any disclaimer, the term of this patent is extended or adjusted under 35 U.S.C. 154(b) by 2421 days.

(21) Appl. No.: 10/440,938

(22) Filed: May 19, 2003

(65) Prior Publication Data

US 2003/0202608 A1    Oct. 30, 2003

Related U.S. Application Data

(63) Continuation-in-part of application No. 10/246,977, filed on Sep. 19, 2002, now Pat. No. 7,440,504.

(60) Provisional application No. 60/324,300, filed on Sep. 24, 2001, provisional application No. 60/429,000, filed on Nov. 25, 2002.

(51) Int. Cl.
  *H04N 7/18* (2006.01)
  *H04N 19/86* (2014.01)
  *H04N 19/159* (2014.01)
  *H04N 19/176* (2014.01)
  *H04N 19/117* (2014.01)
  *H04N 19/16* (2014.01)
  *H04N 19/80* (2014.01)

(52) U.S. Cl.
  CPC ............ *H04N 19/86* (2014.11); *H04N 19/159* (2014.11); *H04N 19/176* (2014.11); *H04N 19/117* (2014.11); *H04N 19/16* (2014.11); *H04N 19/80* (2014.11)

(58) Field of Classification Search
  CPC . H04N 7/50; H04N 7/26148; H04N 7/26351; H04N 7/26585; H04N 7/26244
  USPC ........................................ 375/240.01–240.29
  See application file for complete search history.

(56) References Cited

U.S. PATENT DOCUMENTS

| | | | | |
|---|---|---|---|---|
| 5,825,419 | A * | 10/1998 | Mishima et al. | 375/240.15 |
| 7,095,787 | B2 * | 8/2006 | Kadono et al. | 375/240.27 |
| 7,426,315 | B2 * | 9/2008 | Frishman et al. | 382/268 |
| 7,480,335 | B2 * | 1/2009 | Payson | 375/240.25 |
| 7,574,060 | B2 * | 8/2009 | Gambhire | 382/233 |
| 2003/0189980 | A1 * | 10/2003 | Dvir et al. | 375/240.16 |

* cited by examiner

*Primary Examiner* — Andy Rao
(74) *Attorney, Agent, or Firm* — Foley & Lardner LLP

(57) ABSTRACT

Methods are disclosed for performing improved deblocking filtering across edges between macroblocks, with particular application to cases where one macroblock is field coded and its neighbors are frame coded. A method for filtering across horizontal edges comprises determining which macroblocks are considered to be vertically adjacent to each other. The method also determines which macroblocks are considered to be sampled at a same time. Finally, filtering is performed between vertically adjacent macroblocks that are considered to be sampled at a same time. Another method for filtering across vertical edges comprises determining which macroblocks are considered to be horizontally adjacent to each other. The method effectively re-arranges a vertical ordering of horizontal lines of at least a subset of the horizontally adjacent macroblocks. Finally, filtering is performed between the horizontally adjacent macroblocks after the re-arranging.

21 Claims, 9 Drawing Sheets

Representation of Frame and Field Super-MBs vs. time

METHOD FOR DEBLOCKING FIELD-FRAME VIDEO

CROSS-REFERENCE TO RELATED APPLICATIONS

This application is a continuation in part of U.S. application Ser. No. 10/246,977 filed on Sep. 19, 2002 now U.S. Pat. No. 7,440,504, which is incorporated herein by reference in its entirety, which in turn claims priority to U.S. provisional application Ser. No. 60/324,300 filed on Sep. 24, 2001, and is also incorporated herein by reference in its entirety.

This application also claims priority to U.S. provisional application Ser. No. 60/429,000 filed on Nov. 25, 2002, which is incorporated herein by reference in its entirety.

BACKGROUND OF THE INVENTION

Certain embodiments of the present invention relate to the field of compression and decompression of digital video signals, also referred to as coding, or encoding, and decoding. There is a substantial body of prior art in the area of digital video standards, encoding, and decoding, with a wide variety of implementations and data formats.

More specifically, certain embodiments of the present invention relate to the aspect of video encoding and decoding that is variously called "deblocking", "loop filtering" or "post-processing". The term "deblocking" is used herein.

Aspects of deblocking are addressed by the proposed MPEG-AVC/H.264 draft standard, document number JVT-G050, entitled "Draft ITU-T Recommendation and Final Draft International Standard of Joint Video Specification (ITU-T Rec. H.264 ISO/IEC 14496-10 AVC), which is currently being developed by the MPEG-ITU Joint Video Team. Embodiments of the present invention are an improvement of the system and method disclosed in application Ser. No. 10/246,977 filed on Sep. 19, 2002.

In deblocking of mixed field-frame pictures, there is a problem of how to specify the appropriate filter for use at the boundaries between vertically adjacent macroblocks (MBs) when one neighbor is field coded (field ordered) and the other is frame coded (frame ordered). If both MBs are frame coded, deblocking can be performed conventionally, as is well known in the art. If both MBs are field coded, there are various options. Deblocking is performed using conventional frame filtering methods, but operates on one field at a time.

In the case where the current macroblock (MB) is field coded and the neighboring MB that is vertically adjacent, above or below the current MB, is frame coded, there are various choices that may be made for specifying the filtering at the boundary between the two macroblocks.

In the AVC proposed standard, there is a structure called "super-macroblock" (super-MB) which comprises two vertically adjacent MBs. Super-MB is used when MB-level adaptive field-frame coding (MB-AFF) is enabled. When MB-AFF is enabled, each super-MB may be either field coded or frame coded. A super-MB that is frame coded comprises two vertically adjacent frame MBs (an upper frame MB and a lower frame MB). A super-MB that is field coded comprises two macroblocks, one from each field (a top field MB and a bottom field MB). That is, one of the MBs in a field coded super-MB covers a 16×16 array of pixels in the top field of the frame, and the other MB in the same field coded super-MB covers a 16×16 array of pixels in the bottom field of the same frame.

The FCD (Final Committee Draft) of the AVC (NT) standard specified the above aspect of the deblocking operation as:

"When mb_adaptive_frame_field_flag=1, a MB may be coded in frame or field decoding mode. For frame MB, deblocking is performed on the frame samples. In such a case, if neighbouring MB pairs are field MBs, they shall be converted into frame MB pairs (FIG. 8-3) before deblocking. For field MB, deblocking is performed on the field samples of the same field parity. In such a case, if neighbouring MB pairs are frame MBs, they shall be converted into field MB pairs (FIG. 8-3) before deblocking."

The method described above has a number of problems. In the case of a frame MB, and where the neighboring MBs are field coded, the field coded MBs are "converted into frame MB pairs". In other words, the lines from the two different fields are interleaved together as if they were from one frame which represents one instant in time, which in fact is incorrect. When lines of two different fields are interleaved and filtered together, the filtering tends to cause blurring between the fields. A reasonable assumption is that the encoder chose field coding for the neighboring MBs because the encoder determined that there is inter-field motion and, therefore, it is reasonable to expect inter-field blurring caused by the filtering.

When the current MB is field coded and the neighboring MBs are frame coded, they are "converted into field MB pairs" which causes another problem, since a 4×4 sub-block within a frame MB, when converted into a field MB structure, covers only 2 lines. As a result, a deblocking filter that has an extent of 3 or more pixels on each side of the boundary between MBs would require changing pixels beyond the boundary sub-block an extra time after the result of the normal filtering.

A more recent version of the AVC draft Standard, JVT-E146, referred as the DIS (Draft International Standard) replaces the FCD with the following:

"When mb_adaptive_frame_field_flag is equal to 1, all macroblock pairs are assumed to be reconstructed within the frame independent of the mb_field_decoding_flag."

One interpretation of such a statement is as follows:

"All MBs are converted into frame order before deblocking, regardless of whether the MBs are field coded or frame coded."

Such an interpretation is even more problematic than the version above in the FCD. In the DIS version, with all field coded MBs being combined into frame order and filtered in frame order, there is a large degree of inter-field blurring. When there is motion in the video there tends to be large differences between successive fields, particularly at the edges of objects, and constitutes one of the main reasons an encoder would choose field coding for MBs. Where there are large differences between successive fields, and the top and bottom fields located at one super-MB are combined into one frame, there are large differences between successive lines within the resulting combined MB, even if there are little or no differences between lines within any given field MB and even if there are no blocking artifacts in any one field. Such differences between lines, that are artificially induced by the conversion of field super-MBs into frame super-MBs, cause the deblocking filter to work to reduce those differences and cause blurring from one field to the next, thereby tending to defeat the advantage of choosing field coded super-MBs.

It is desirable to find a method of deblocking pictures of video that contain a mixture of field and frame coding such that blockiness is reduced and there are no additional image impairments introduced.

Further limitations and disadvantages of conventional, traditional, and proposed approaches will become apparent to one of skill in the art, through comparison of such systems with the present invention as set forth in the remainder of the present application with reference to the drawings.

BRIEF SUMMARY OF THE INVENTION

An embodiment of the present invention provides an improved method of performing deblocking filtering across horizontal and vertical edges between macroblocks, with particular application to cases where one macroblock is field coded and one or more of its neighbors are frame coded.

A method for filtering across horizontal edges (i.e., between vertically adjacent macroblocks), comprises determining which macroblocks of video data are considered to be vertically adjacent to each other. The method also determines which macroblocks of video data are considered to be sampled at a same time. Finally, filtering is performed between vertically adjacent macroblocks of the macroblocks of video data that are considered to be sampled at a same time.

A method for filtering across vertical edges (i.e., between horizontally adjacent macroblocks), comprises determining which macroblocks of video data are considered to be horizontally adjacent to each other. The method effectively re-arranges a vertical ordering of horizontal lines of at least a subset of the horizontally adjacent macroblocks of video data. Finally, filtering is performed between the horizontally adjacent macroblocks of video data after the re-arranging.

These and other advantages and novel features of the present invention, as well as details of an illustrated embodiment thereof, will be more fully understood from the following description and drawings.

DETAILED DESCRIPTION OF THE INVENTION

Figure 1:
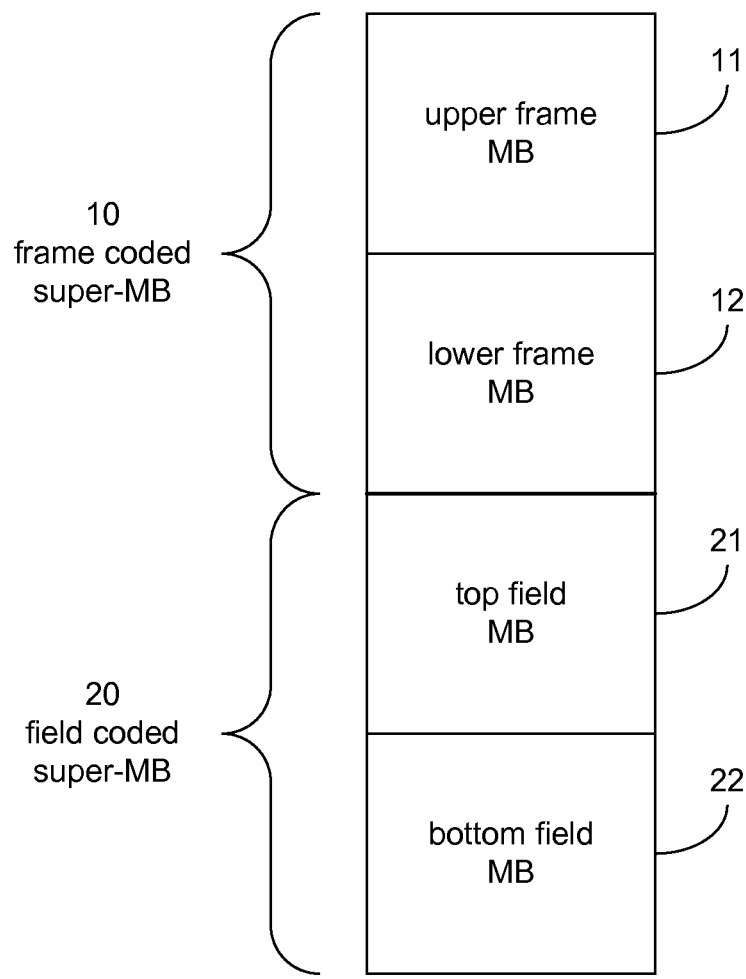
FIG. 1 illustrates a frame coded super-macroblock of video data vertically adjacent to and above a field coded super-macroblock of video data to be filtered across a horizontal boundary between the two super-macroblocks in accordance with an embodiment of the present invention.
Figure 2:
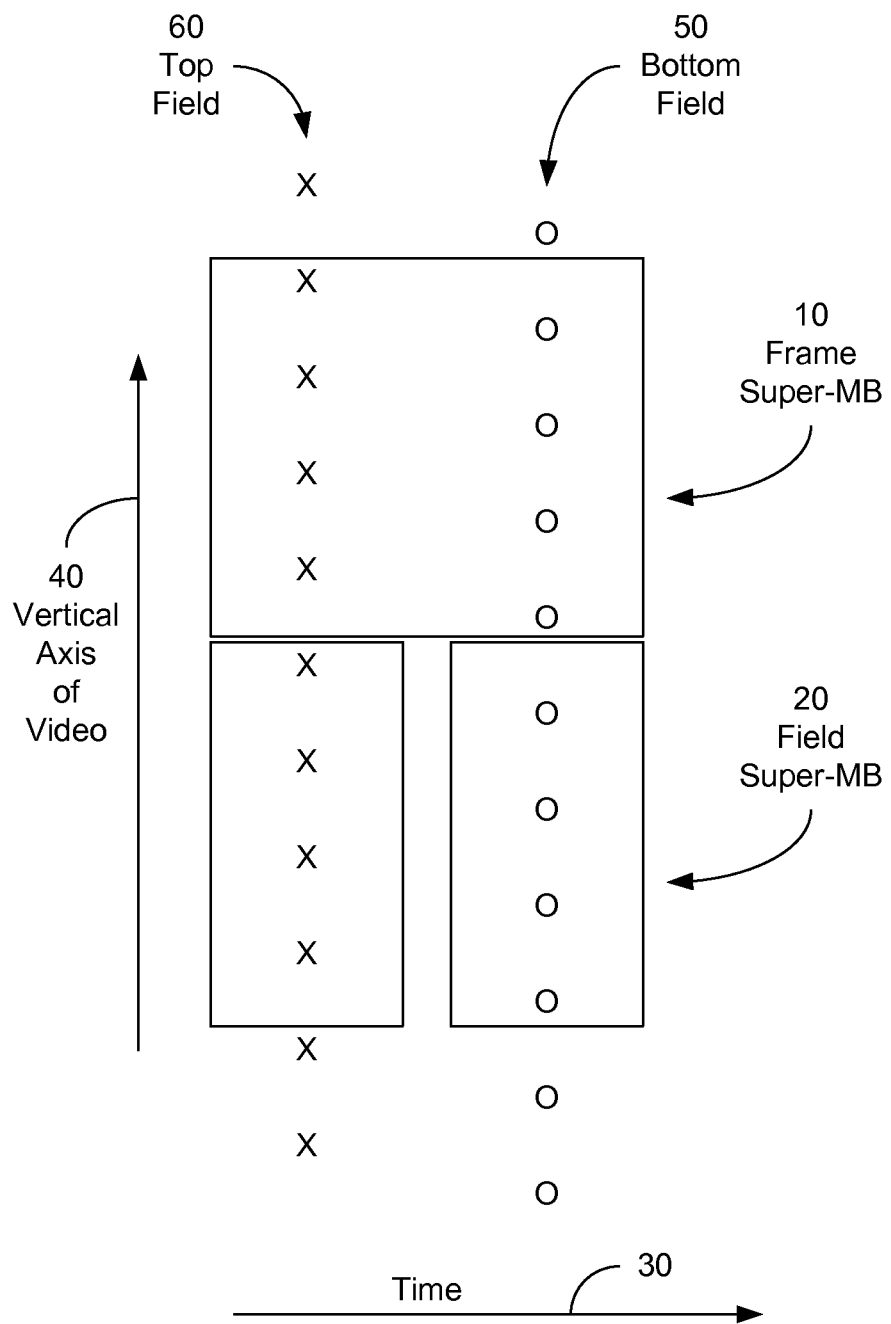
FIG. 2 illustrates a representation of frame and field coded super-macroblocks of video data versus time in accordance with an embodiment of the present invention.

FIG. 1 and FIG. 2 illustrate the arrangement of field and frame MBs in video that has a field structure, also referred to as interlaced video. FIG. 1 shows the super-MB structure that is used in the current draft of the AVC Standard. When MB-AFF is enabled, MBs are grouped into pairs called super-MBs. In the AVC standard, each MB is of the size 16×16 pixels.

Each super-MB is either frame coded or field coded. In frame coded super-MBs, a super-MB 10 comprises two MBs 11 and 12, each of which contains a set of sequential lines from a frame, and one MB (the upper frame MB 11) is directly above the other (lower frame MB 12), in the sense of the vertical axis of the video. A field coded super-MB 20 comprises two MBs 21 and 22, one from each of the two fields, i.e. top field 21 and bottom field 22.

FIG. 2 illustrates a frame coded super-MB 10 and a field coded super-MB 20 below the frame coded super-MB 10, showing the time axis 30 and vertical axis of the video 40. The top field lines and bottom field lines are shown separately in the frame coded super-MB 10 to illustrate their relation to top field and bottom field lines in field coded super MB's. In FIG. 2, the bottom field 50 follows the top field 60 in time. The "X"s indicate top field lines, and the "O"s indicate the bottom field lines. The number of lines per super-MB in FIG. 2 are not to scale, FIG. 2 illustrates the nature of temporal sampling of interlaced video.

In general, in interlaced video, each field is sampled at a different time, with the time interval between successive fields normally being constant. In regions of a video image where there is little or no motion, it may be appropriate for a video compressor to group lines from the two fields together and treat them as if they were sampled at one time. Such a case is, in effect, illustrated by the frame super-MB 10.

In regions of a video image where there is significant motion or brightness change between the two fields, it may be appropriate for a video compressor to separate the two fields and treat them somewhat independently. Such a case is illustrated by the field super-MB 20.

In video standards and formats other than AVC, the super-MB arrangement may not be used, however the same methods described herein apply nevertheless. For example, in MPEG-2, there are no super-MBs, however there are frame coded MBs and field coded MBs, such that frame coded MBs comprise 16×16 arrays of pixels, while field coded MBs comprise 16×8 arrays of pixels (8 lines high). Apart from the terminology and the number of lines per MB, similar principles apply as with AVC.

In the improved methods of deblocking described herein, the operations of deblocking across horizontal edges, i.e. the edges between vertically adjacent MBs, are performed in accordance with an embodiment of the present invention as described below.

Filtering is performed between vertically adjacent MBs that are considered to be sampled at the same time, wherever possible. For example, in the case of two vertically adjacent field super-MBs 110 and 120 as shown in FIG. 3, the top field MBs 111 and 113 from the adjacent super-MBs 110 and 120 are filtered together and, separately, the bottom field MBs 112 and 114 from the adjacent super-MBs 110 and 120 are filtered together as shown in FIG. 4.

Figure 4:
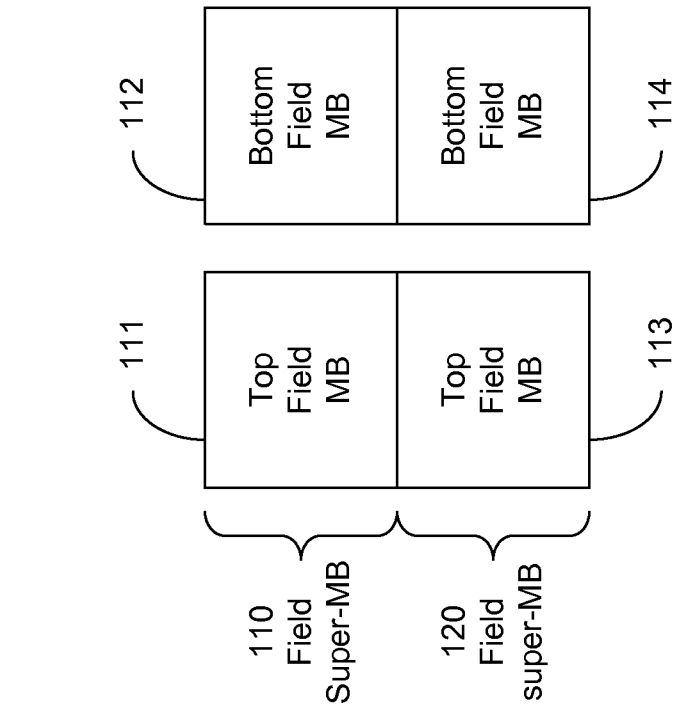
FIG. 4 illustrates an effective re-arrangement of the fields of the field coded super-macroblocks of FIG. 3 to accommodate filtering across the horizontal boundary of the two super-macroblocks in accordance with an embodiment of the present invention.
Figure 3:
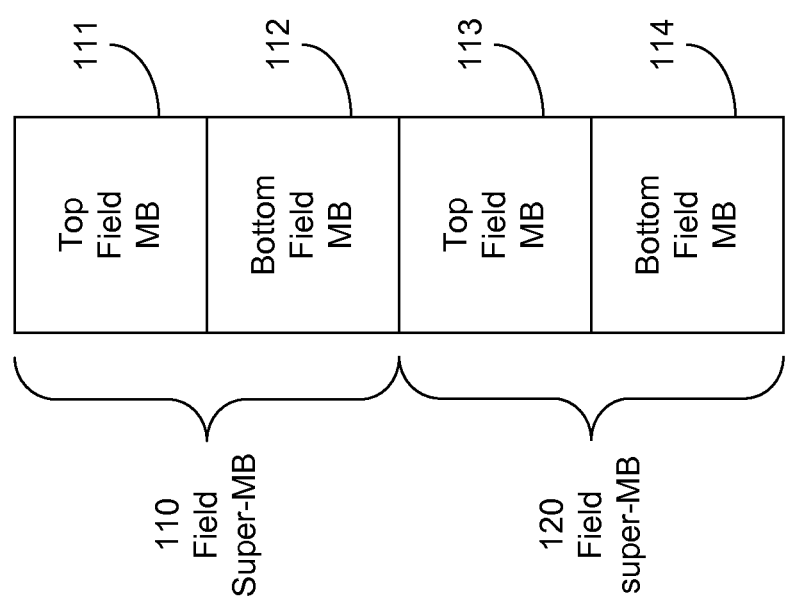
FIG. 3 illustrates a first field coded super-macroblock of video data vertically adjacent to a second field coded super-macroblock of video data to be filtered across the horizontal boundary between the two super-macroblocks in accordance with an embodiment of the present invention.

Referring to FIG. 3 and FIG. 4, note that the MBs that are adjacent in the same field are not adjacent in the super-MB data structure. In the case of two vertically adjacent frame super-MBs, each MB is filtered with the directly adjacent MB. MBs that are adjacent within the same super-MB and in separate, adjacent super-MBs are normally considered to have been sampled at the same time since they are all frame coded and part of the same frame.

In cases where adjacent super-MBs are not of the same type i.e. field vs. frame, the sampling time of each of the fields in a field super-MB are not generally considered to be the same as the sampling time of the frame in an adjacent frame super-MB. In such cases, pixel data representing a close approximation to the same sampling time is used for filtering. For example, when one super-MB is frame coded and the adjacent super-MB is field coded, the frame represented in the frame super-MB may be considered to cover the sample times of both the top field and bottom field of the adjacent field super-MB.

The MB within the frame coded super-MB that is nearer to the field coded super-MB is preferably used for filtering with the adjacent edge of both the top field MB and the bottom field MB within the field super-MB. For example, in FIG. 5, a lower frame macroblock 12 of a frame coded super-macroblock 10 is vertically closer than the upper frame macroblock of super-MB 10 is to the lower field super-macroblock 20 since the frame coded super-macroblock 10 is vertically above the field coded super-macroblock 20 (see FIG. 1). In accordance with an embodiment of the present invention, the lower frame macroblock 12 is considered to be sampled at the same time as the top field macroblock 21 and they are, therefore, filtered together. Also, the lower frame macroblock 12 is considered to be sampled at the same time as the bottom field macroblock 22 and they are, therefore, filtered together.

Certain embodiments of the present invention provide a filtering method for horizontal edges or boundaries which may be viewed as several different discrete cases and is illustrated and described herein. Filtering of vertical edges between horizontally adjacent MBs may also be viewed as several different discrete cases and is also described herein in accordance with an embodiment of the present invention.

In a first case, the horizontal boundary between two adjacent frame coded super-MBs is considered. In accordance with an embodiment of the present invention, both super-MBs are treated as frame coded, which they are, and the edges are filtered directly as specified in the filter specification.

In a second case, the horizontal boundary between two adjacent field coded super-MBs (see FIG. 3 and FIG. 4) is considered. In accordance with an embodiment of the present invention, the individual top field (111 and 113) and bottom field (112 and 114) MBs are logically re-arranged within the super-MBs to form two edges, or the equivalent, between the two super-Ms: one for top field and one for bottom field. The fields are matched according to polarity (top vs. bottom). The matching operation does not necessarily require actually moving the data, but merely describes an aspect of the filter algorithm.

Figure 5:
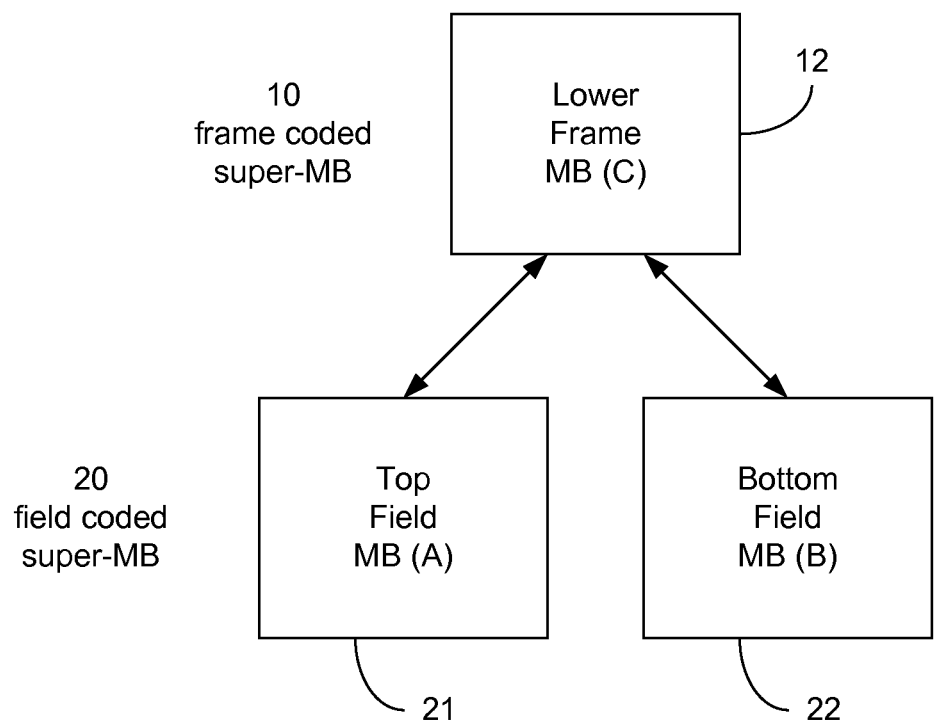
FIG. 5 illustrates a lower frame macroblock of the frame coded super-macroblock of FIG. 1 that is to be filtered across a horizontal boundary with the vertically adjacent field coded super-macroblock of FIG. 1 in accordance with an embodiment of the present invention.

In a third case, the super-MB of interest is a field coded super-MB 20, and the super-MB 10 above it is frame coded as illustrated in FIG. 1. In accordance with an embodiment of the present invention, each of the field MBs 21 and 22 in the field coded super-MB 20 is logically re-arranged so that it borders the lower frame MB 12 in the frame coded super-MB 10 above as illustrated in FIG. 5. In such a logical re-arrangement, both the top field 21 and bottom field 22 MBs in the lower super-MB 20 border the lower MB 12 in the frame coded super-MB 10 above it and logically have a common border.

For the third case, there are a few choices for handling the common border that include, but are not limited to: Filter A with C and then B with C; filter B with C and then A with C; filter A with the top field samples of C and filter B with the bottom field samples of C; filter only A with C but not B with C; filter B with C but not A with C; choose whether to filter A or B with C depending on which of A and B is more similar to C; choose whether to filter A or B with C depending on which of A and B is less similar to C; or do not filter the edge from either A or B. Each option has minor advantages and disadvantages. An embodiment of the present invention filters A with the top field samples of C and filters B with the bottom field samples of C. The meanings of top field samples and bottom field samples of a frame coded macroblock are illustrated in FIG. 2, top field 60 and bottom field 50 of frame super-MB 10.

Figure 6:
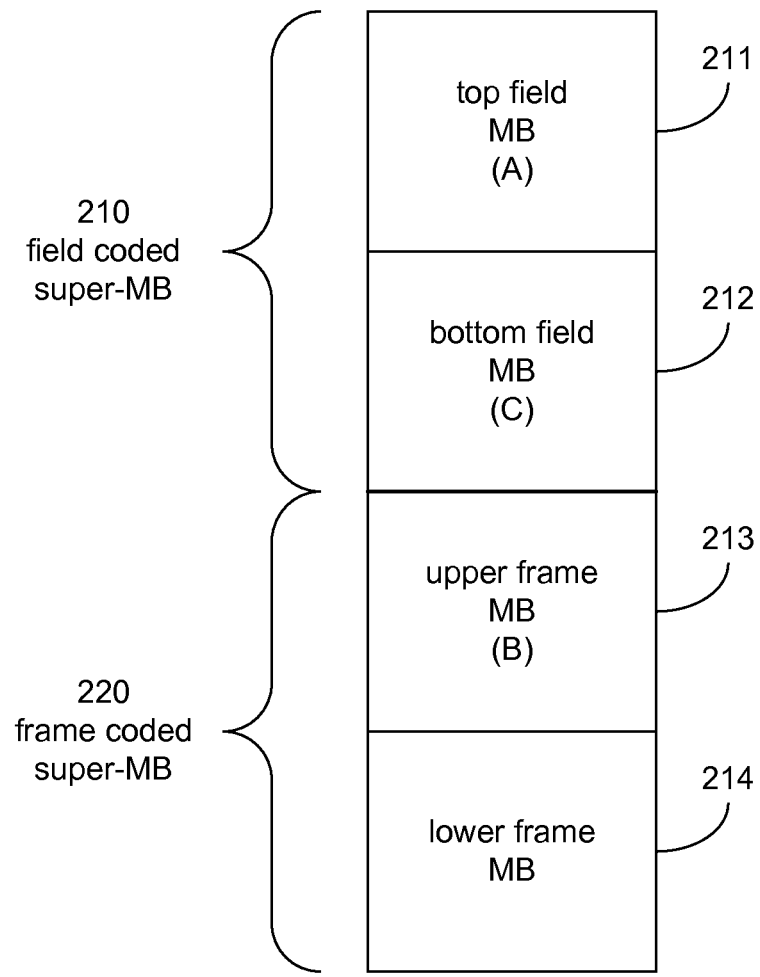
FIG. 6 illustrates a field coded super-macroblock of video data vertically adjacent to and above a frame coded super-macroblock of video data to be filtered across a horizontal boundary between the two super-macroblocks in accordance with an embodiment of the present invention.

In a fourth case, the super-MB of interest is a frame coded super-MB 220, and the super-MB 210 above it is field coded as illustrated in FIG. 6. The boundary between the upper frame MB 213 and lower frame MB 214 in the frame coded super-MB 220 is filtered across in the conventional manner, since the two MBs are both frame coded.

Figure 7:
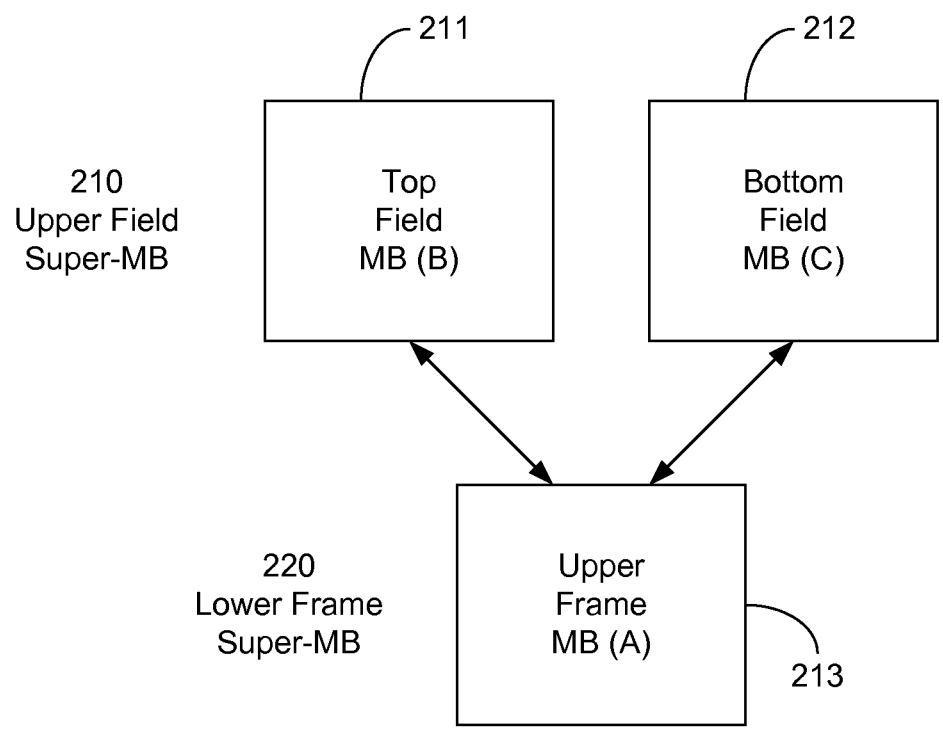
FIG. 7 illustrates an upper frame macroblock of the frame coded super-macroblock of FIG. 6 that is to be filtered across a horizontal boundary with the vertically adjacent field coded super-macroblock of FIG. 6 in accordance with an embodiment of the present invention.

The MBs 211 and 212 in the field coded super-MB 210 above the frame coded super-MB 220 may be re-arranged logically as illustrated in FIG. 7.

For the fourth case, there are multiple choices of how to handle the boundary between A, the upper frame MB 213 in the frame coded super-MB 220, and B and C, the two MBs 211 and 212 in the field coded super-MB 210 above. In accordance with an embodiment of the present invention, the options include, but are not limited to: Filter A with B and then A with C; filter A with C and then A with B; filter the top field samples of A with B and filter the bottom field samples of A with C; filter A with B and not with C; filter A with C and not with B; filter A with a mixture of B and C; or do not filter the edge of A with either B or C.

Each option has advantages over prior and proposed deblocking methods. An embodiment of the present invention filters the top field samples of A with B and filters the bottom field samples of A with C.

Vertical edges are between horizontally adjacent MBs, or equivalently between horizontally adjacent super-MBs, and are filtered in the horizontal direction by deblocking filters. There are five cases of the types of horizontally adjacent MBs.

In a first case, where a frame MB is horizontally adjacent to another frame MB, filtering is performed conventionally in accordance with an embodiment of the present invention.

In a second case, where a field MB is horizontally adjacent to another field MB of the same polarity, (i.e. both are top fields or both are bottom fields) filtering is performed conventionally in accordance with an embodiment of the present invention.

In a third case, where a field MB is horizontally adjacent to another field MB of the opposite polarity, (i.e. one is a top field and the other is a bottom field), the case never occurs in a well-designed video coding system such as AVC or MPEG-2. The case is preferably prevented from occurring in accordance with an embodiment of the present invention. If such a case does occur, the field MBs are logically re-arranged such that each field MB is horizontally adjacent to another field MB of the same polarity, and the result is filtered conventionally.

Figure 8:
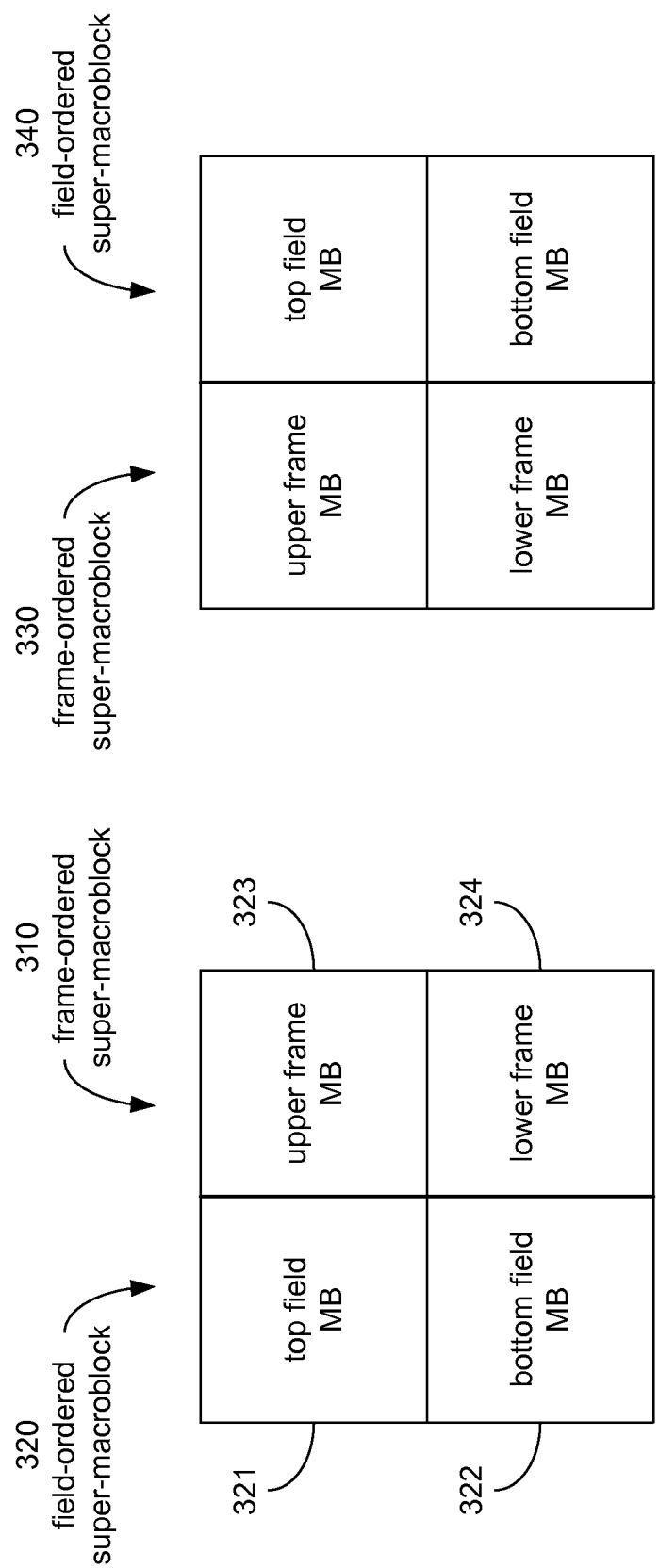
FIG. 8 illustrates frame coded super-macroblocks horizontally adjacent to field coded super-macroblocks to be filtered across a vertical boundary between the frame coded and field coded super-macroblocks in accordance with an embodiment of the present invention.

A fourth case is shown in FIG. 8, where there is a frame ordered super-MB 310 with a field ordered super-MB 320 to its left. The term "frame ordered" may be used interchangeably with "frame coded", and the term "field ordered" may be used interchangeably with "field coded", as indicated previously herein. In accordance with an embodiment of the present invention, the horizontal video lines in the field ordered super-MB 320 are logically re-arranged into frame order before performing the filtering across the vertical edge. That is, the top-field MB 321 and the bottom field MB 322 are effectively interleaved with each other. For the purpose of filtering across the vertical edge, this is equivalent to re-arranging the frame ordered super-MB 310 into field order before filtering. That is, the horizontal lines of the upper frame MB 323 and the lower frame MB 324 are effectively separated or un-interleaved to match the field order of the field ordered super macroblock 320. Note that the re-arrangement before filtering does not cause inter-field blurring, unlike the problem with filtering horizontal edges after a similar logical re-arrangement.

A fifth case is also shown in FIG. 8, where there is a field ordered super-MB 340 with a frame ordered super-MB 330 to its left. In accordance with an embodiment of the present invention, the horizontal video lines in the field ordered super-MB 340 are logically re-arranged into frame order, or equivalently, the horizontal video lines of the frame coded super-MB 330 are logically re-arranged into field order, before performing the filtering across the vertical edge. This is equivalent to the case above and does not cause inter-field blurring.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

Aspects of the present invention relate to the process of adaptively filtering motion compensated reconstructed blocks of video data in order to improve coding efficiency and quality. Some coding standards such as H.263 and H.26L make use of a deblocking filter in the coding and decoding loop in order to reduce blocking artifacts at the edges where one block interfaces to another. This type of filter is known as a loop filter and it can take on a variety of forms depending on the standard; however, it generally involves processing of pixels along the block edges spanning across neighboring block boundaries in both horizontal and vertical directions.

Current standards making use of loop filters are based on progressive video content. Particularly in the case of loop filtering, the horizontal and vertical edges of the block consists of pixels that are correlated in both horizontal and vertical directions in the sense that they have been sampled at the same frame-time. This is the normal result of the fact that progressive video is being processed. Known prior art involving loop filtering does not, however, deal with interlaced coded blocks.

Further limitations and disadvantages of conventional and traditional approaches will become apparent to one of skill in the art, through comparison of such systems with the present invention as set forth in the remainder of the present application with reference to the drawings.

If the above-mentioned progressive video standards are modified to handle interlaced content, each block is coded in either a frame mode or field mode. A possible solution for coding interlaced pictures is to simply code the fields as separate pictures so that all blocks in the field are field-coded; however this may have drawbacks of reduced coding efficiency and picture quality. Another possible solution is to code each block in a frame with independent selections per block of either a progressive entity ("frame coded") or as an interlaced entity containing lines from two fields ("field coded"). Frame coded blocks are the default for progressive video coding standards. However, in field mode, half the lines in the block are generated from one field of video and the other half of the lines come from the other field; which may necessitate special procedures if loop filtering is to be used.

Figure 9:
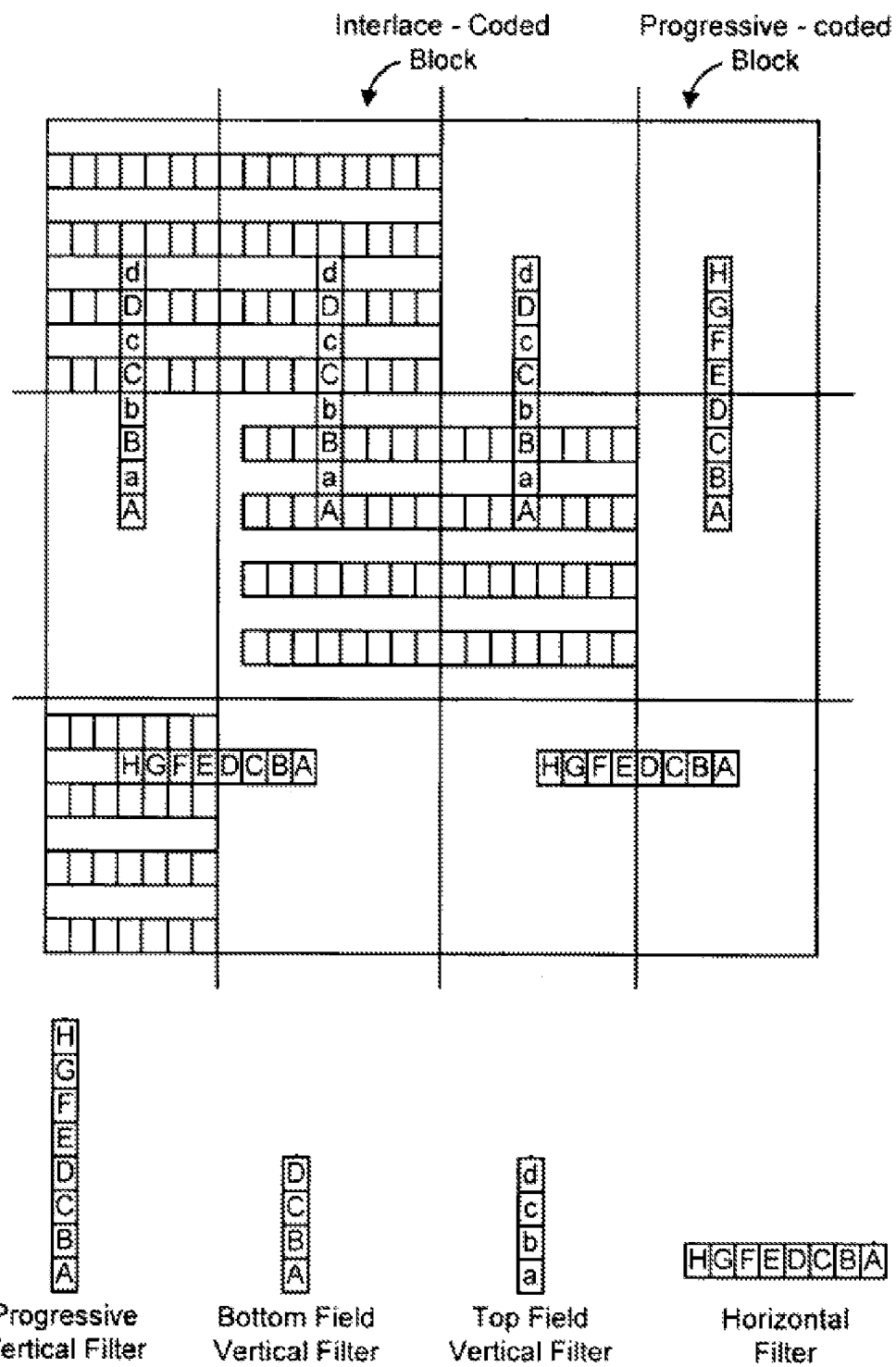
FIG. 9 is an illustration of a set of adjacent blocks of video pixels and how to filter across boundaries between the blocks in accordance with an embodiment of the present invention.

If the standards are modified to support both field coded and frame coded blocks in the same frame picture, there may be a problem with loop filtering at the interfaces between adjacent blocks where a block on one side of the interface is field coded and a block on the other side of the interface is frame coded. There may be problems in both the horizontal and vertical directions, but it is particularly difficult in the vertical direction since adjacent lines in the frame are not from the same sampling time, i.e., adjacent frame lines (and therefore block lines) belong to different fields. This situation is illustrated in FIG. 9, where the blocks without lines of pixels denote data that has been frame-coded, while the blocks with lines denote lines of pixels that have been coded as separate fields.

Support of interlace or field coded blocks with loop filtering, or in-loop deblocking, is provided by one embodiment of the present invention. One aspect of the invention is the performance of loop filtering (also called in-loop deblocking) across an interface between a frame coded block and a field coded block, with different filtering modes and selections of lines to be filtered depending on the field or frame coded type of each block, as well as on other parameters, for example.

Regardless of how a particular standard decides to perform loop filtering, the pixels across the block edges are analyzed and processed, and given certain results from the analysis, the actual values of the edge pixels are changed with the goal of reducing block coding artifacts.

One solution in accordance with the present invention involves examining motion vectors, activity values and whether vertically adjacent blocks were coded as separate fields in order to program the filter/analysis windows to handle the field data independently as appropriate. It may be assumed that if a block has been field-coded there must have been a good reason on the part of the encoder to make this choice, i.e., there was inter-field motion in the video being encoded.

Figure 10:
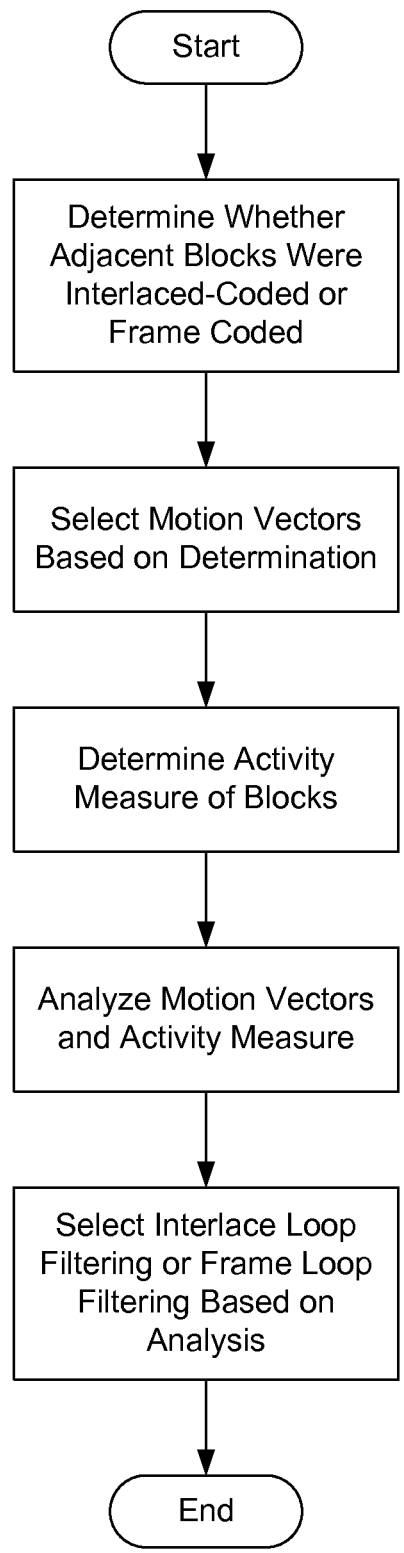
FIG. 10 is an illustration of a method of determining the type of loop filtering to be employed in accordance with an embodiment of the present invention.

More particularly, FIG. 10 illustrates a method of determining the type of loop filtering to be employed, in accordance with one embodiment of the invention. First, a determination is made whether adjacent blocks (e.g., top and bottom) were interlaced coded or frame coded. Next, motion vectors are selected based on the determination. In addition, an activity measure of the blocks being considered is determined. The motion vectors and the activity measure determined are then analyzed, and either interlace loop filtering or frame loop filtering is selected based on the analysis.

In one embodiment, a decision to process the edge of vertically adjacent blocks in frame or interlaced loop filtering mode is made by

- Determining whether either top/bottom block was interlace-coded
- Analyzing the motion vectors for the non-intra coded adjacent blocks
- Examining activity measures of neighboring blocks
- Applying a weighting factor to the parameters obtained in order to make the loop filtering decision If either top/bottom block is interlace-coded, the field motion vectors are used from the interlace-coded blocks as received in the bitstream. If one neighboring block is frame-coded, the same motion vectors are used when referring to top and bottom portions of the block (i.e., behave as if the frame-coded block consisted of two field-coded blocks with the same vectors).

The method of analysis of motion vectors for adjacent non-intra-coded blocks may involve a similarity measure, for example. If the difference between the neighboring vectors for each field is above a programmable threshold Thresh_1, then it is assumed this condition to mean that the vectors are not similar to each other (implicitly trusting the encoder to have made the right decision), and therefore the interlace loop filter (described below) is used. However, if the vectors are similar and below another threshold Thresh_2 (used to indicate little or no relative motion) and the activity measures of the blocks under study is the same, then a frame loop filtering mode is used since this mode of operation is more effective on frame correlated data. Programmable weighting factors may be used to determine which measure (motion vectors or activity value) have more influence in the decision to use interlace loop filtering.

In one embodiment of loop filtering solution, the pixels along vertically-oriented edges between dissimilar field and frame coded blocks are processed by adaptively filtering the edge of one field in the field coded block with the corresponding lines in the adjacent frame coded block, and also adaptively filtering the edge of other field in the field coded block with its corresponding lines in the adjacent frame coded block. In many loop filter designs the horizontal filter/analysis window is the same whether the adjacent blocks have been coded as frames or fields, but in some loop filter designs the filter operation on vertical edges could differ, for example, if the filter processes a 2-dimensional set of pixels. When processing the horizontally-oriented edges, a vertical filter/analysis window is used taking into account whether adjacent blocks (above or below the edge) are field coded or frame coded. Whenever vertically adjacent blocks (either top neighbor or bottom neighbor) differ in the way they were coded (progressive or interlace, i.e., frame or field coded) two separate versions of the filter/analysis windows are, one for each field. Since this mode of operation is used when either of the two vertically adjacent blocks is interlace-coded, the top field lines of both blocks is processed separately from the bottom field lines (see, e.g., vertical filter in FIG. 9).

In FIG. 9, the filter/analysis window for pixels in the frame coded blocks in the same frame is denoted as A, B, C, D, E, F, G (assuming in this example a maximum window of eight pixels, four at each side of the block edge—the same method is readily extended to different numbers of pixels). This filter/analysis window is also used for the vertical edge (horizontal filter/analysis) regardless of frame or field coding. For the cases where either top/bottom neighboring blocks are field coded, the 8-pixel window is separated into two 4-pixel windows: a, b, c, d for the top field and A, B, C, D for the bottom field. As can be seen in FIG. 9, the frame-coded block is separated into top field/bottom field portions to match the interlace-coded block.

The method described above implies that the actual filter length for vertically adjacent blocks in which any neighbor was field-coded is half the size of the filter for frame coded blocks. However, different sets of coefficients may be used for the field-coded edges. It is not necessary that the field coded version of the filter be half the size of the frame coded version; variations are possible with longer or shorter filters in either case.

For example, in the case of H.26L Loop Filtering, the changes to handle interlace with minimal changes to the current specification (TML-8) may involve only processing four edge pixels (p2, p1, q1, q2). In cases where p3 or q3 are used in the formulas, they are substituted for p1 and q1, respectively. The stronger filter mode also does not include p3, and q3 which requires adjustment of the coefficients for P1 and P2 from [26, 26, 26] to [43, 42, 43]. Refer to H.26L Loop Filter process document for more details, which document is hereby incorporated by reference herein in its entirety.

The interlaced loop filter of the present invention allows the use of modern interlaced coding methods in digital video compression methods, while simultaneously supporting high quality loop filtering, for best quality visual results.

Many modifications and variations of the present invention are possible in light of the above teachings. Thus, it is to be understood that, within the scope of the appended claims, the invention may be practiced otherwise than as described hereinabove. One embodiment, however, can be seen as a method of selecting a filter in video decoding comprising: determining whether adjacent blocks were interlaced coded or frame coded; selecting motion vectors based on the determination; determining an activity measure of the adjacent blocks; analyzing the motion vectors and the activity measure; and selecting one of interlace loop filtering or frame loop filtering based on the analysis.

What is claimed is:

1. In a system having a first block of video data, the system further having a second block of video data vertically-adjacent to the first block of video data, a method comprising:
   - determining whether the first block of video data is frame-coded or field-coded;
   - determining whether the second block of video data is frame-coded or field-coded;
   - in response to the first block of video data and the second block of video data both being frame-coded, processing the first block of video data and the second block of video data using a frame-deblocking filter; and
   - in response to at least one of the first block of video data or the second block of video data being field-coded, processing the first block of video data and the second block of video data using a field-deblocking filter.

2. The method of claim 1, wherein the first block of video data and second block of video data each comprises interlaced top field lines and bottom field lines.

3. The method of claim 2, wherein the processing of the first block of video data and the second block of video data using a field-deblocking filter comprises:
   - processing the top field lines of the first block of video data and the second block of video data; and
   - separately processing the bottom field lines of the first block of video data and the second block of video data.

4. The method of claim 1, wherein the field-deblocking filter has a first filter length, wherein the frame-deblocking filter has a second filter length, wherein the first filter length is half the second filter length.

5. The method of claim 1, wherein the first block of video data is eight (8) pixels by eight (8) pixels.

6. The method of claim 1, wherein the first block of video data is sixteen (16) pixels by sixteen (16) pixels.

7. The method of claim 1, wherein the second block of video data is eight (8) pixels by eight (8) pixels.

8. The method of claim 1, wherein the second block of video data is sixteen (16) pixels by sixteen (16) pixels.

9. A video-processing system, comprising:
a first block of video data being either frame-coded or field-coded;
a second block of video data being either frame-coded or field-coded;
a frame-deblocking filter to filter the first block of video data and the second block of video data when the first block of video data and the second block of video data are both frame-coded; and
a field-deblocking filter to filter the first block of video data and the second block of video data when at least one of the first block of video data or the second block of video data is field-coded.

10. The system of claim 9, wherein:
the first block of video data comprises interlaced top field lines and bottom field lines; and
the second block of video data comprises interlaced top field lines and bottom field lines.

11. The system of claim 10, wherein the field-deblocking filter further processes the top field lines of the first block of video data and the second block of video data, wherein the field-deblocking filter further separately processes the bottom field lines of the first block of video data and the second block of video data.

12. The system of claim 9, wherein the field-deblocking filter has a first filter length, wherein the frame-deblocking filter has a second filter length, wherein the first filter length is half the second filter length.

13. The system of claim 9, wherein the first block of video data is eight (8) pixels by eight (8) pixels.

14. The system of claim 9, wherein the first block of video data is sixteen (16) pixels by sixteen (16) pixels.

15. The system of claim 9, wherein the second block of video data is eight (8) pixels by eight (8) pixels.

16. The system of claim 9, wherein the second block of video data is sixteen (16) pixels by sixteen (16) pixels.

17. The system of claim 9, wherein the field-deblocking filter has a first filter length, wherein the frame-deblocking filter has a second filter length, wherein the first filter length is different from the second filter length.

18. A video-processing system, comprising:
a first block of video data of sixteen-by-sixteen (16×16) pixels being either frame-coded or field-coded;
a second block of video data of 16×16 pixels being either frame-coded or field-coded;
a frame-deblocking filter to filter the first block of video data and the second block of video data when the first block of video data and the second block of video data are both frame-coded; and
a field-deblocking filter to filter the first block of video data and the second block of video data when at least one of the first block of video data or the second block of video data is field-coded.

19. The system of claim 18, wherein:
the first block of video data comprises interlaced top field lines and bottom field lines; and
the second block of video data comprises interlaced top field lines and bottom field lines.

20. The system of claim 18, wherein the field-deblocking filter is configured to process the top field lines of the first block of video data and the second block of video data and separately process the bottom field lines of the first block of video data and the second block of video data.

21. The system of claim 18, wherein the field-deblocking filter has a first filter length and the frame-deblocking filter has a second filter length, the first filter length being different from the second filter length.

* * * * *